United States Patent
Chang et al.

(10) Patent No.: US 8,572,437 B2
(45) Date of Patent: Oct. 29, 2013

(54) MULTI-PLATFORM TEST AUTOMATION ENHANCEMENT

(75) Inventors: Yee Kang Chang, Markham (CA); Bosco Li, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1709 days.

(21) Appl. No.: 11/185,461

(22) Filed: Jul. 20, 2005

(65) Prior Publication Data

US 2007/0022324 A1   Jan. 25, 2007

(51) Int. Cl.
*G06F 11/00* (2006.01)

(52) U.S. Cl.
USPC ........ 714/38.1; 714/38.14; 717/124; 717/125

(58) Field of Classification Search
USPC ................ 714/38, 38.1, 38.14; 717/124, 125
See application file for complete search history.

(56) References Cited

U.S. PATENT DOCUMENTS

| | | | |
|---|---|---|---|
| 5,557,740 A | | 9/1996 | Johnson et al. |
| 5,845,234 A | | 12/1998 | Testa et al. |
| 6,023,773 A | * | 2/2000 | O'Donnell et al. ............. 714/40 |
| 6,195,765 B1 | * | 2/2001 | Kislanko et al. ................ 714/38 |
| 6,522,995 B1 | | 2/2003 | Conti et al. |
| 6,662,312 B1 | | 12/2003 | Keller et al. |
| 6,907,546 B1 | * | 6/2005 | Haswell et al. ................. 714/38 |
| 6,983,400 B2 | * | 1/2006 | Volkov ............................ 714/38 |
| 6,993,682 B2 | * | 1/2006 | Corrie ............................. 714/38 |
| 7,020,797 B2 | * | 3/2006 | Patil ................................. 714/4 |
| 7,165,191 B1 | * | 1/2007 | Vakrat ............................. 714/38 |
| 7,165,256 B2 | * | 1/2007 | Boudnik et al. ............. 718/104 |
| 7,287,190 B2 | * | 10/2007 | Rosenman et al. ............. 714/32 |
| 7,296,190 B2 | * | 11/2007 | Vakrat et al. .................... 714/38 |
| 7,299,382 B2 | * | 11/2007 | Jorapur ........................... 714/38 |
| 7,299,451 B2 | * | 11/2007 | Dygon et al. ................. 717/124 |
| 2003/0131285 A1 | | 7/2003 | Beardsley et al. |
| 2003/0140138 A1 | | 7/2003 | Dygon et al. |
| 2004/0003325 A1 | * | 1/2004 | Muller et al. ................... 714/38 |
| 2004/0015861 A1 | * | 1/2004 | Nagalkar ...................... 717/124 |
| 2004/0044992 A1 | * | 3/2004 | Muller et al. ................. 717/124 |
| 2004/0153774 A1 | * | 8/2004 | Gavish et al. ................... 714/25 |
| 2004/0243381 A1 | * | 12/2004 | Kuturianu et al. ............. 703/22 |
| 2005/0022194 A1 | * | 1/2005 | Weir et al. ..................... 718/100 |
| 2005/0204201 A1 | * | 9/2005 | Meenakshisundaram et al. ............................. 714/38 |

(Continued)

OTHER PUBLICATIONS

IBM Corporation, Research Disclosure No. 447; #126, p. 1220 (Jul. 2001).

(Continued)

*Primary Examiner* — Joshua P Lottich
(74) *Attorney, Agent, or Firm* — Steven Greenberg, Esq.; Carey, Rodriguez, Greenberg & O'Keefe

(57) ABSTRACT

Embodiments of the present invention address deficiencies of the art in respect to host platform configuration for software testing and provide a novel and non-obvious method, system and computer program product for multi-platform test automation. In an embodiment of the invention, a multi-platform test automation data processing system can include a test automation controller enabled for coupling to multiple, different designated host computing platforms. Each of the different designated host computing platforms can host the execution of an application under test. The test automation controller can include a configuration for dispatching test commands to the different designated host computing platforms based upon provided test case documents, topology data and a general function file. In this way, tests can be constructed from a set of test commands without regard to the underlying details of different, target host computing platforms.

4 Claims, 4 Drawing Sheets

(56) References Cited

U.S. PATENT DOCUMENTS

2006/0218446 A1* 9/2006 Crawford ................... 714/38
2006/0271824 A1* 11/2006 Kwong et al. ............... 714/38
2007/0016829 A1* 1/2007 Subramanian et al. ...... 714/38
2007/0129947 A1* 6/2007 Agapi et al. ............... 704/257

OTHER PUBLICATIONS

D.J. Ballard et al., *Automated Build Checkout System for Multiple Platforms*, in IBM Corporation Technical Disclosure Bulletin, vol. 35. No. 6, pp. 378-379 (Nov. 1992).

* cited by examiner

MULTI-PLATFORM TEST AUTOMATION ENHANCEMENT

BACKGROUND OF THE INVENTION

1. Field of the Invention

The present invention relates to the field of software testing and more particularly to the field of test automation across multiple host computing platforms.

2. Description of the Related Art

The art of software development extends far beyond a mere coding of a functional specification for a computer program. Modern software development conforms to a lifecycle which begins with the functional specification leading into the formulation of a suitable architecture for an application implementing the functional specification. The lifecycle continues with the physical coding of the application and includes iterative testing and modification cycles to ensure the integrity of the code. Finally, the execution of the completed code can be analyzed to facilitate the further revision of the code to improve the performance of the code.

Traditional testing of a computer program can include the external monitoring of the integrity of the program and the performance of the program, either subjectively based upon end user impression, or objectively based upon independently acquired metrics. In the latter circumstance, the integrity of the program can include the simulation of user interaction with the user interface of the program to ensure the proper operation of the program logic. Likewise, the performance of the program can include an internal monitoring of the code through software test tooling as is known in the art.

Often, to test an application, testing personnel must establish and configure a testing environment. To the extent that the application is to be tested across multiple host computing platforms, the testing environment must be established and configured for each host computing platform—a very tedious and time and resource intensive process. In fact, it is well known that more than half of the time consumed by testing personnel is consumed in the course of establishing and configuring host environments for different host computing platforms. In this regard, the process of establishing and configuring host environments can be quite complex and repetitive.

Presently, it is known to automate individual steps and portions of a testing protocol. Common techniques include operating system scripts, batch files and the like. Yet, each of the foregoing techniques generally is platform specific and cannot scale to include multiple disparate host computing platforms. In fact, the fragmented and piecemeal nature of the foregoing techniques inhibits resource sharing and re-use in practice. Thus, the desirable principles of re-use and resource sharing have not been applied to multi-platform test automation.

BRIEF SUMMARY OF THE INVENTION

Embodiments of the present invention address deficiencies of the art in respect to host platform configuration for software testing and provide a novel and non-obvious method, system and computer program product for multi-platform test automation. In an embodiment of the invention, a multi-platform test automation data processing system can include a test automation controller enabled for coupling to multiple, different designated host computing platforms. Each of the different designated host computing platforms can host the execution of an application under test. The test automation controller can include a configuration for dispatching test commands to the different designated host computing platforms based upon provided test case documents, topology data and a general function file. In this way, tests can be constructed from a set of test commands without regard to the underlying details of different, target host computing platforms.

In another embodiment of the invention, a method for multi-platform test automation can include processing topology data to configure a testing environment for one or more specified host computing platforms, formatting test commands in a syntax for the specified host computing platform, and dispatching the formatted test commands to the host computing platform to conduct testing operations within the configured testing environment for the host computing platform. Optionally, the results from the dispatched commands can be compared with expected results for the dispatched commands and error handling can be performed where the results are unexpected. Finally, the method can include performing the processing, formatting and dispatching for different host computing platforms.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for multi-platform test automation. In accordance with an embodiment of the present invention, a test automation control can process a pre-configured test case document and a platform topology document to construct a queue of commands for testing an application in a designated host computing platform. The pre-configured test case document can specify a set of commands to be dispatched to the designated host computing platform in order to achieve a test of a hosted application. The topology document, in turn, can specify configuration parameters for the designated platform such that the platform can be pre-configured to host the test. Notably, the testing of the application can be automated across multiple different designated platforms by providing different topology data within one or more topology documents to the test automation control for a test case document.

Figure 1:
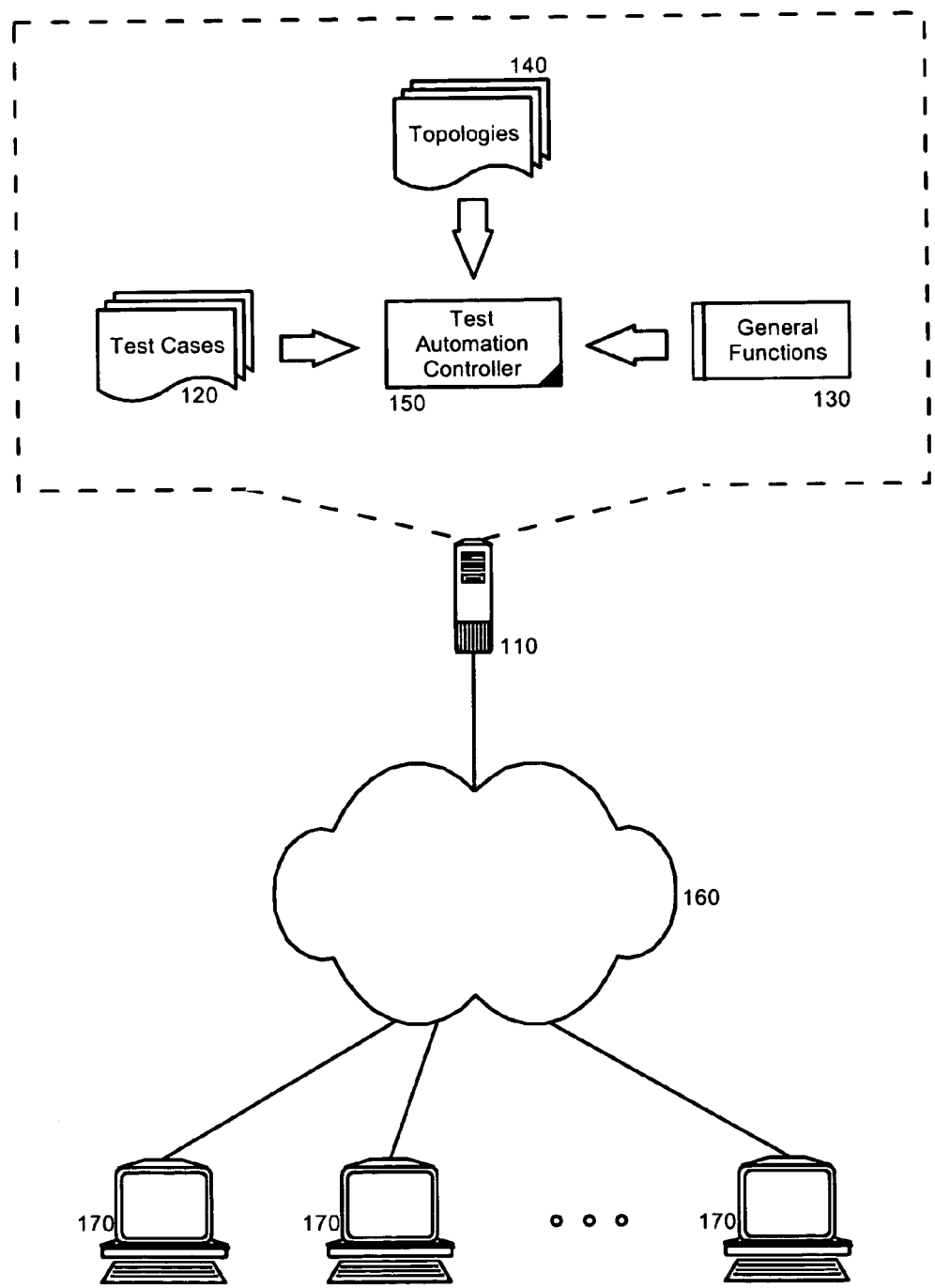
FIG. 1 is a schematic illustration of a data processing system configured for multi-platform test automation.

In further illustration, FIG. 1 is a schematic illustration of a data processing system configured for multi-platform test automation. The data processing system can include an automated test system 110 configured for communicative coupling to one or more target host computing platforms 170 over a computer communications network 160. The automated test system 110 can include a test automation controller 150. The test automation controller 150 can define an interface for accessing multi-platform test automation logic disposed within the test automation controller 150. The automation logic itself can process test case documents 120 and one or more topology documents 140 along with general functions file 130 to establish and configure a testing environment in designated ones of the target host computing platforms 170 and to dispatch the execution of tests within the configured environments of the designated ones of the target host computing platforms 170.

The test case documents 120 can be definition files that specify commands to be executed for testing an application. As an example, a test case document 120 can include a sequence of functions to be executed in a test environment within a target host computing platform 170. The test automation controller 150 can parse the test case document 120 to identify the desired commands and to dispatch the commands to the target host computing platform 170 for execution. Each of the topology documents 140, by comparison, can include topology data including a set of software paths, configuration parameters and log paths for one or more specific machine platform types such as a particular operating system or computing processor. In one aspect of the invention, a single one of the topology documents 140 can be provided with topology data for multiple platform types, while in another aspect of the invention, multiple topology documents 140 each can be provided with topology data for different machine platform types.

Finally, the general functions 130 can include a command syntax library, for different designated target host computing platforms 170. An exemplary general functions file 130 follows:

```
<application role="webserver">
  <!-- Win ******************************************************>
  <cmd type='start' osType='win' value='apache'/>
  <cmd type='stop' osType='win' value='apache -k shutdown'/>
  <cmd type='restart' osType='win' value='apache -k restart'/>
  <!-- Aix ******************************************************>
  <cmd type='start' osType='aix' value='./&apache; start'/>
  <cmd type='stop' osType='aix' value='./&apache; stop'/>
  <cmd type='restart' osType='aix' value='./&apache; restart'/>
  <!-- Sun ******************************************************>
  <cmd type='start' osType='sun' value='./&apache; start'/>
  <cmd type='stop' osType='sun' value='./&apache; stop'/>
  <cmd type='restart' osType='sun' value='./&apache; restart'/>
  <!-- ***********************************************************>
</application>
```

Figure 2:
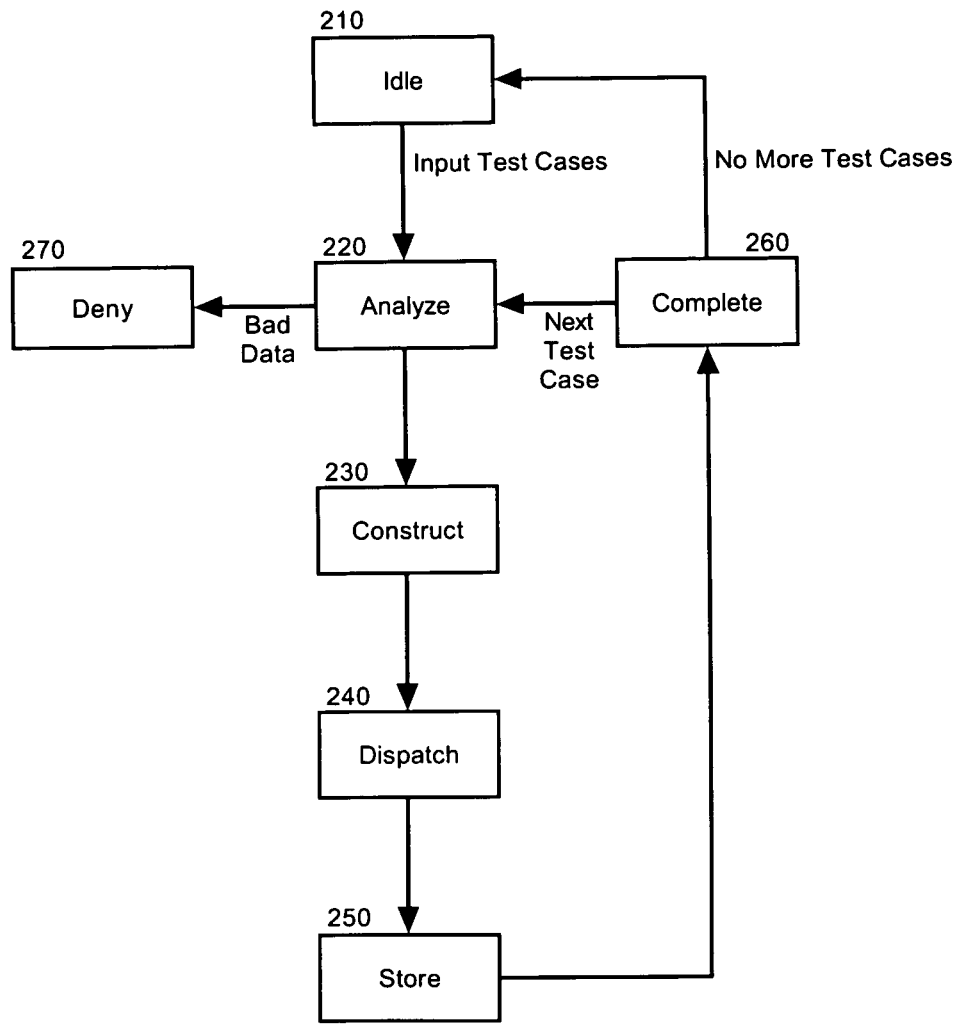
FIG. 2 is a high level flow diagram of a multi-platform test automation process; and, FIGS. 3 through 6, taken together, are a flow chart illustrating a multi-platform test automation process.

In further illustration, FIG. 2 is a high level flow diagram of a multi-platform test automation process for use in the system of FIG. 1. Leading from an initial, idle state 210, the inputting of test case can cause the transition from the idle state 210 to an analysis state 220. In the analysis state 220, the test case can be parsed to determine a set of commands implementing a test. Additionally, in the analysis state 220, a set of resources targeted for the test can identified. In the event that incorrect data has been included in the test case, a state transition to a test denial state 270 can occur. Otherwise, a transition to a construct state 230 can occur.

In the construct state 230, commands for a designated platform or platforms can be constructed based upon the test case and topology data for one or more designated target host computing platforms. Once the commands have been constructed, a state transition to a dispatch state 240 can occur. In the dispatch state 240, the constructed commands can be dispatched for execution in the designated target host platforms. Subsequently, a state transition can occur to a store state 250 in which the test results can be accumulated and reported. Finally, in a completion state 260 it can be determined whether additional test cases remain to be processed and a state transition can return to the analysis state 220 for additional test cases, while a state transition can return to an idle state 210 when no further test cases remain to be processed.

Figure 3:
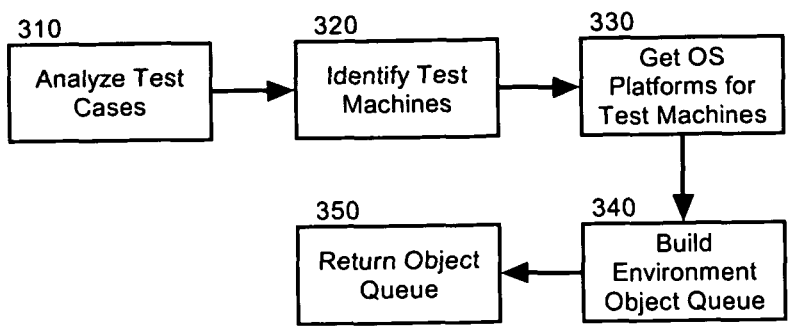

In more specific illustration, FIGS. 3 through 6, taken together, are a flow chart illustrating a multi-platform test automation process. Referring first to FIG. 3 which illustrates the process performed while in the analysis state, in block 310 a test case can be analyzed and in block 320, the target host computing platforms for the test can be identified. For example, each of the target host computing platforms can be queried dynamically in order to identify the target host computing platforms. In block 330, the operating system for each identified target host platform can be determined and in block 340 a configuration for the environments of the identified target host computing platforms can be determined and stored in an environment object queue. Finally, in block 350 the environment object queue can be provided for use in the construction state.

Figure 4:
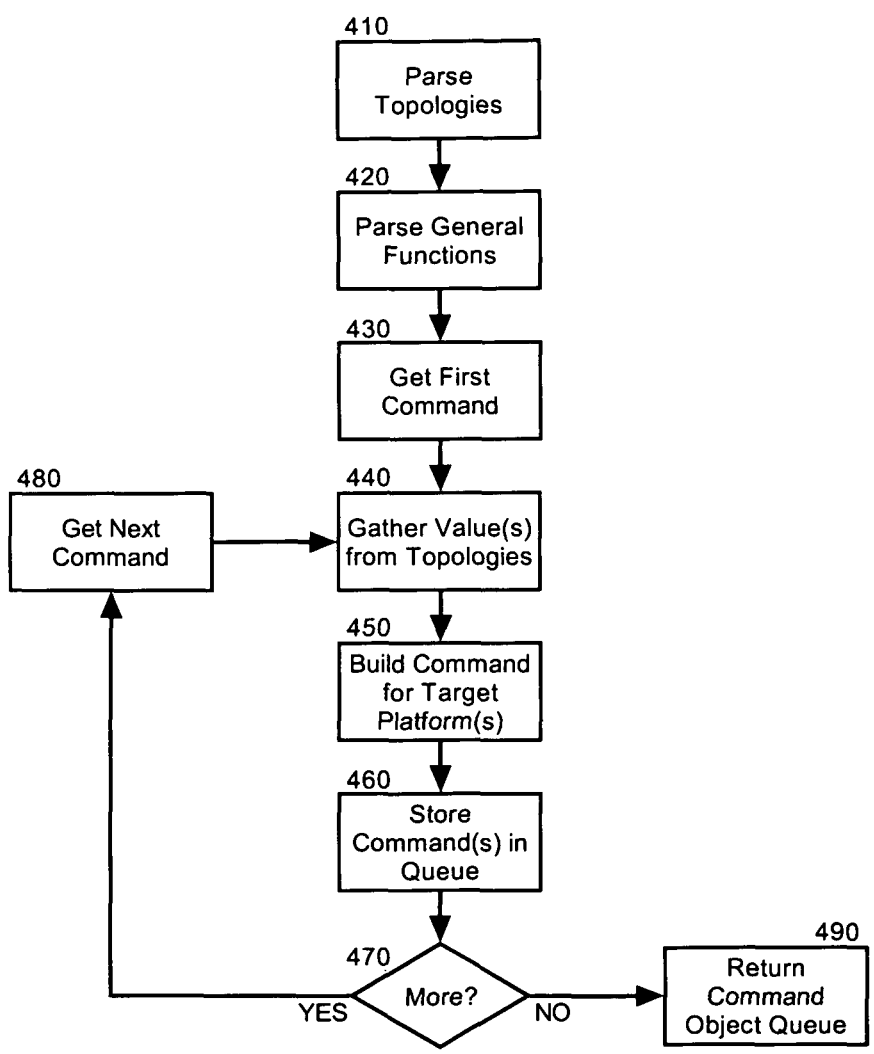

Turning now to FIG. 4, a process performed in the construction state is shown. In block 410, topology data for one or more designated target host platforms can be parsed to identify environmental variables. Also, in block 420 the general functions requested can be parsed to identify the proper syntax for commands for the designated target host computing platforms. Subsequently, in block 430 a first command for a test case can be retrieved for processing. In block 440, the values for the topology data can be determined for each of the different designated target host platforms, and in block 450 one or more commands for each of the different designated target host platforms can be constructed according to the syntax for the respective designated target host computing platform. Finally, in block 460 the commands can be queued for dispatching to one or more of the designated target host computing platforms.

Figure 5:
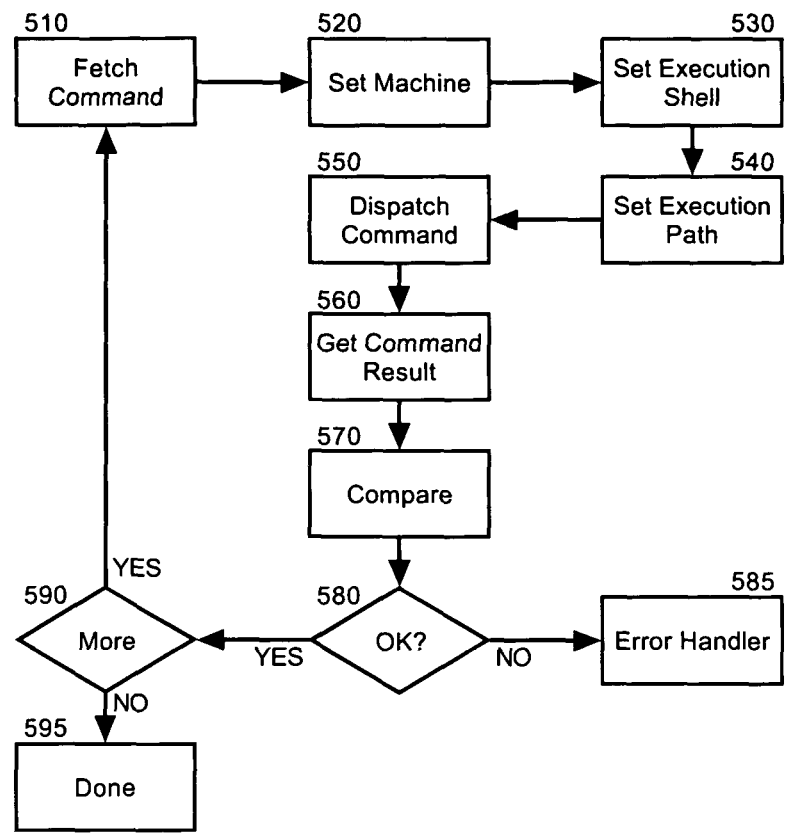
Figure 6:
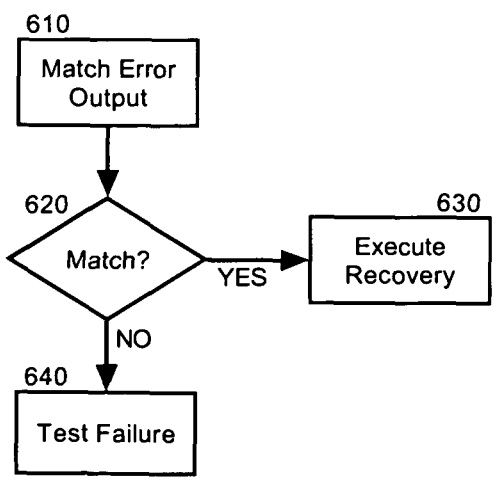

In decision block 470, if additional commands remain to processed, in block 480 a next command can be retrieved and the process can continue in blocks 440 through 470. When no further commands remain to be processed, in block 490 the queued commands can be provided to the dispatching state. Specifically, FIG. 5 illustrates a dispatching process for performance in the dispatching state. In particular, in block 510, a command can be fetched from the queue and in block 520 the designated host computing platform for the command can be set and in block 530 an execution shell can be set for the designated host computing platform. Also, in block 540 an execution path can be set for the designated host computing platform. Finally, in block 550 the command can be dispatched to the designated host computing platform. It is to be noted, however, the commands can be dispatched to different designated host computing platforms for concurrent execution in the different designated host computing platforms.

In block 560, the result from the execution of the command can be received and in block 570, the result can be compared to an expected result. In decision block 580, if the result does not match with the expected result, than an error condition can be processed in block 585. Specifically, referring to FIG. 6, in block 610, the error output for the command can be tested for known errors. In decision block 620, if a match is identified, known recovery logic can be performed in block 630. Otherwise, the test can be deemed a failure in block 640 and logged for further review.

Returning to FIG. 5, in decision block 580, if the command result matches the expected result, it can be presumed that the command executed successfully and that no error condition processing will be required. In consequence, in decision block 590, if additional commands remain to be processed in the queue, the process can repeat in blocks 510 through 580 for a next command in the queue. Otherwise, the process can complete in block 595.

It will be recognized by the skilled artisan that the multi-platform controller of the invention can define a standard interface for all users and operations, thereby allowing execution of tests cases across multiple platform on multiple machines with both error handling and status reporting. As such, when users write a test case, the test case can be written in a platform independent manner without incorporating details associated with specific target platforms. Additionally, the use of the general functions file permits the quick development and re-use of functionalities across different platforms. Finally, the use of topology documents permits the externalization of physical system-related data irrespective of the test cases defined within the test case documents.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for multi-platform test automation, the method comprising:
   processing topology data to configure a testing environment for a specified host computing platform, the topology data specifying a set of software paths, configuration parameters and log paths for one or more specific machine platform types;
   formatting test commands in a syntax for said specified host computing platform;
   dispatching said formatted test commands to said host computing platform to conduct testing operations within said configured testing environment for said host computing platform;
   processing additional topology data to configure a different testing environment for a different specified host computing platform;
   formatting said test commands in a different syntax for said different specified host computing platform; and,
   dispatching said formatted test commands in said different syntax to said different specified host computing platform to conduct said testing operations within said configured testing environment for said different specified host computing platform.

2. The method of claim 1, further comprising:
   comparing results from said dispatched commands with expected results for said dispatched commands; and,
   performing error handling where said results are unexpected.

3. The method of claim 2, wherein said performing error handling where said results are unexpected comprises:
   matching said unexpected results to a known condition; and,
   executing recovery logic in response to said matching.

4. The method of claim 2, further comprising reporting said results.

* * * * *